United States Patent [19]

King

[11] Patent Number: 5,023,772
[45] Date of Patent: Jun. 11, 1991

[54] METHOD AND SYSTEM FOR STORING MESSAGES BASED UPON A NON-QUERIED NAME ASSIGNMENT

[75] Inventor: Richard P. King, Thornwood, N.Y.

[73] Assignee: International Business Machines Corporation, Armonk, N.Y.

[21] Appl. No.: 264,420

[22] Filed: Oct. 31, 1988

[51] Int. Cl.⁵ .............................................. G06F 12/02
[52] U.S. Cl. .................................... 364/200; 364/245;
364/245.4; 364/245.2; 364/284; 364/284.3;
364/241
[58] Field of Search ... 364/200 MS File, 900 MS File

[56] References Cited
U.S. PATENT DOCUMENTS 4,412,285  10/1983  Neches et al. ...................... 364/200
4,420,807  12/1983  Nolta et al. ......................... 364/200
4,484,262  11/1984  Sullivan et al. ..................... 364/200
4,543,627   9/1985  Schwab .............................. 364/200
4,630,196  12/1986  Bednar, Jr. et al. ................ 364/200
4,644,470   2/1987  Feigenbaum et al. ............... 364/200

Primary Examiner—Thomas M. Heckler
Assistant Examiner—Kevin A. Kriess
Attorney, Agent, or Firm—Ratner & Prestia

[57] ABSTRACT

A message storage system and method having a plurality of message storage facilities with storage locations and a storage facility manager. The message storage system assigns individual names to messages as they are input into a message storage facility and stores the messages in free storage locations, while returning the name of the messages to the host devices which sent them.

10 Claims, 10 Drawing Sheets

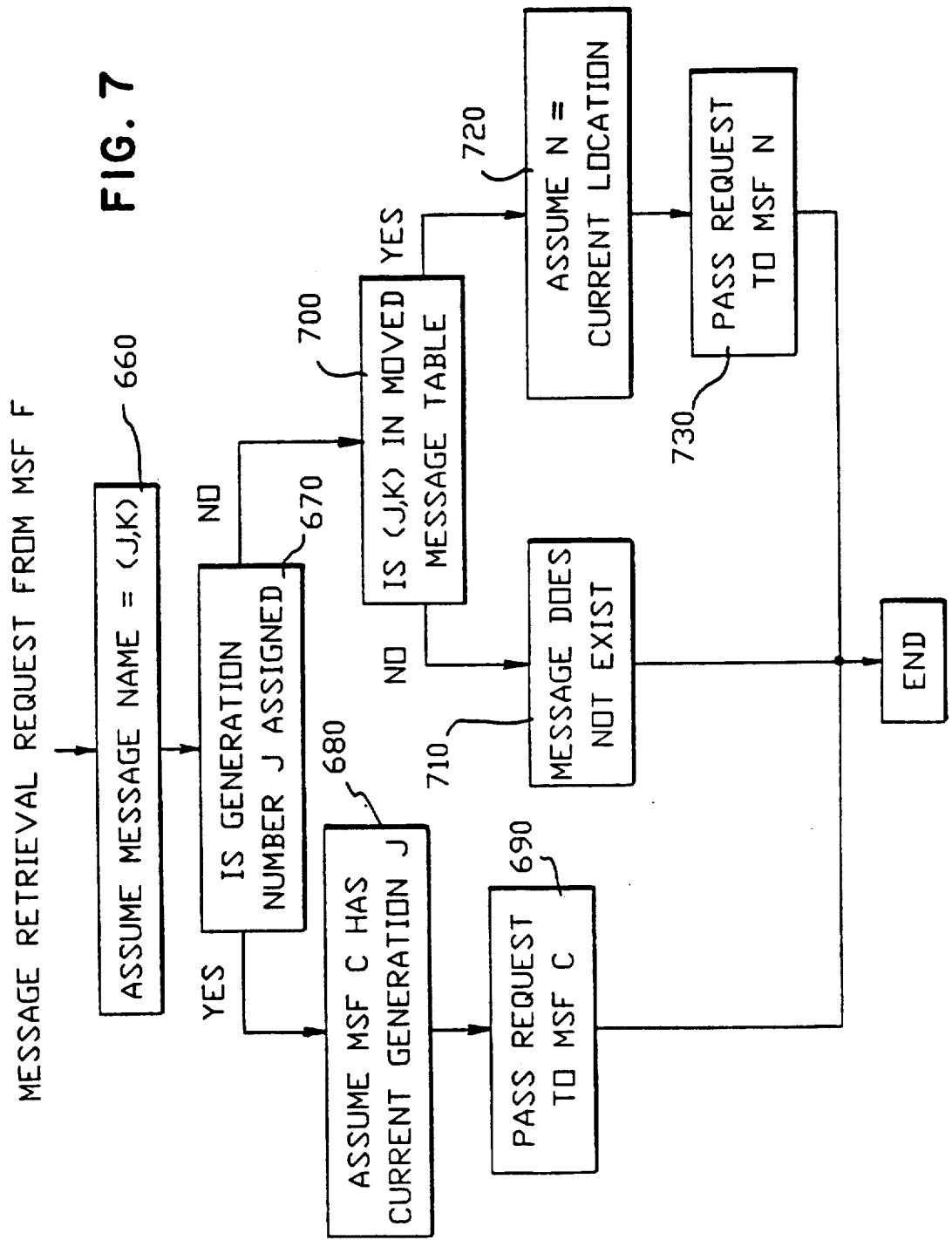

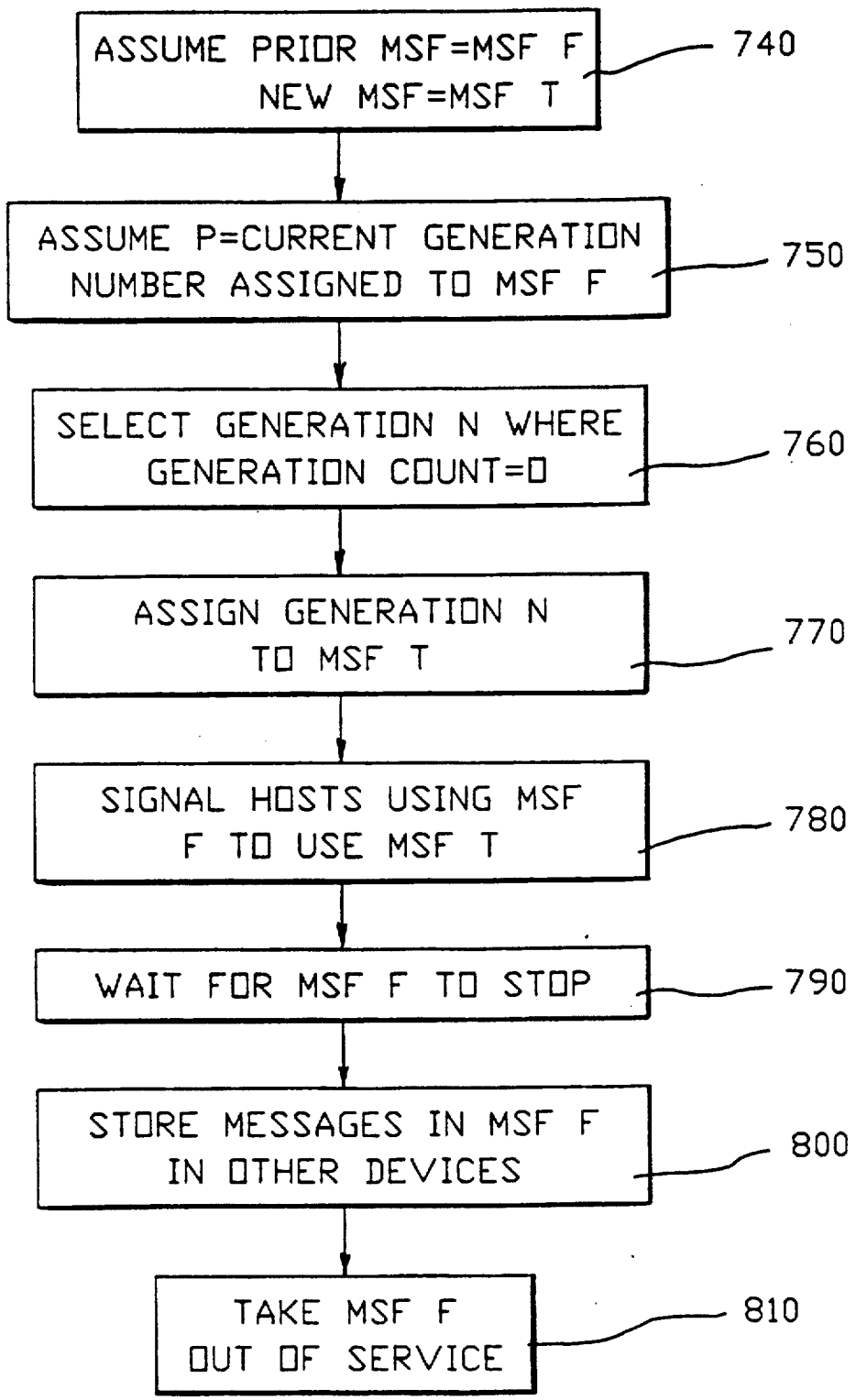

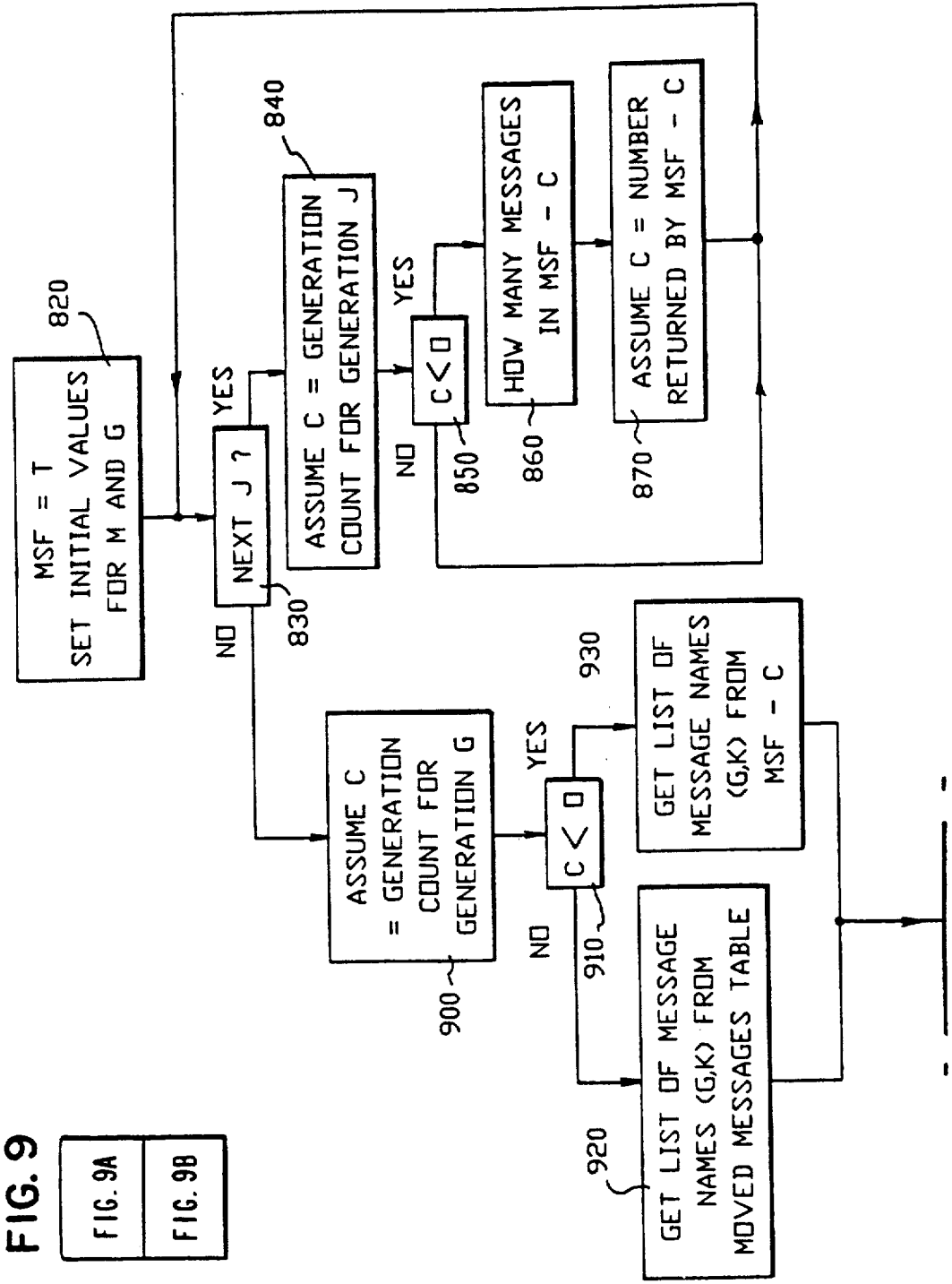

METHOD AND SYSTEM FOR STORING MESSAGES BASED UPON A NON-QUERIED NAME ASSIGNMENT

BACKGROUND OF THE INVENTION

1. Field of the Invention

This invention relates to systems involved in the storage and retrieval of information, and host devices particularly of messages from a plurality of host devices.

2. Summary of the Invention

A message storage system is used to store incoming messages for later retrieval by various host processors for purposes such as communications and database processing. It is comprised of two main components: the message storage facility and the storage facility manager. The message storage facility is where the actual messages are stored and also where messages are initially inputted and retrieved. The second component, the storage facility manager, coordinates the message storage among several message storage facilities and external storage devices, such as disk drives. The storage facility manager ensures that messages are always assigned a unique name by moving messages and tracking messages around the system as any given message storage facility approaches its storage capacity.

In operation, a message storage system assigns unique names to messages as they come into the system without requiring that a message storage facility query the entire system for an available name. The method of storing messages inherently ensures that a unique name will be assigned to each message so that no confusion can arise when a request to retrieve a message is presented by a host processor, such as a communications or database device.

3. Background Art

The problem of assigning unique names is usually encountered in distributed databases. When an object is created at one site, it must be given a name which is unique throughout the entire database. One way in which this has been done was to query or poll every other site in the system to ensure that a name to be assigned was not in use. Methods accomplished this technique by either global locking or by a static partitioning of the name space.

By globally locking all of the names, the creator of the new message is free to choose any new name. Further, if a message is moved from one location to another, information about it need only be kept at its current location, since future namings will entail a query at all sites in such a system. The price of this freedom-in-name assignment is the time and expense of stopping the assigning of names at all sites every time any one site wants to pick a new name and all sites must be queried.

Another method which avoids the system overhead costs is to create names by taking all or part of a given message and concatenating it with the name of the site at which it has been created, i.g. for a message Sam stored at a site Houston, using the name Sam.Houston. The drawback to this method is that when the message named "Sam.Houston," is relocated in the database to a location such as Dallas, a record of that name must be kept in Houston noting its existence and its current location in Dallas. Otherwise, at some later date, another Sam might be created at Houston, violating the uniqueness requirement of such a system.

Therefore, an object is to assign individual or unique names to objects or messages with freedom and ease of name assignment without having to consult any other sites in the system. A further object is the ability to move messages or objects to other sites without having to maintain a record of the name to ensure no name duplication takes place.

BRIEF DESCRIPTION OF THE FIGURES

FIG. 7 is a flowchart illustrating a message retrieval request to the SFM.

FIG. 8 is a flowchart illustrating how the SFM distributes the work load from one MSF to another.

FIGS. 9A and 9B are a flowcharts illustrating how the SFM assigns a new generation number when no generation numbers are free.

DETAILED DESCRIPTION OF THE INVENTION

Figure 1:
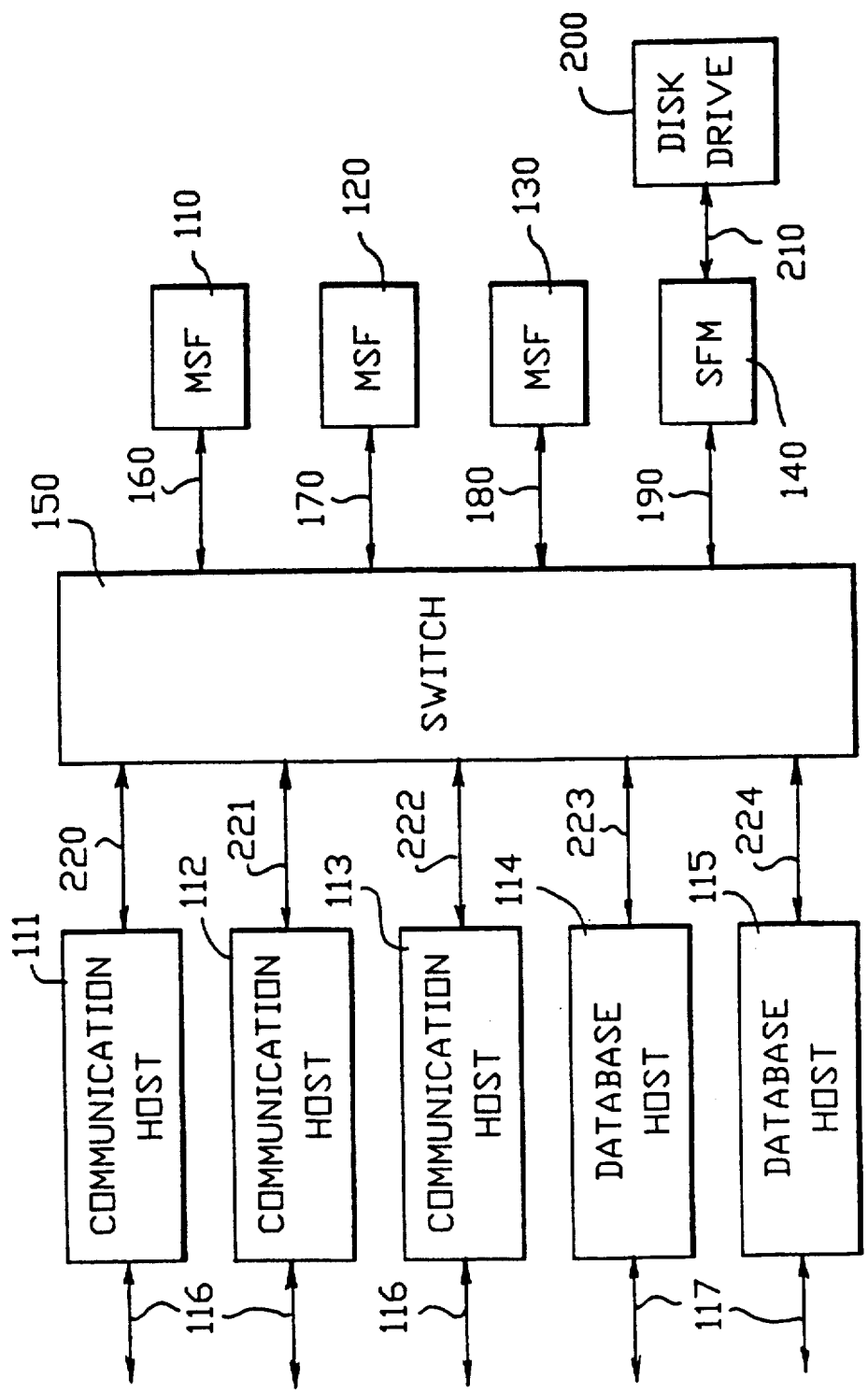
FIG. 1 is a message storage system comprising three message storage facilities, a storage facility manager and switch according to the invention.

There is shown in FIG. 1 a message storage system (MSS) 100. In MSS 100, various host processors, such as host processors 111-115, may be connected to other devices through communication lines 116 for interactive communication (through a VTAM system, for example) or data lines 117 which may be connected to disk drives (through an IMS system, for example). Other devices may be attached to either or both the communication lines as understood by those skilled in the art. The host processors are also connected to an interconnection mechanism such as switch 150, through data lines 220-224.

The actual message storage components of MSS 100 are the message storage facilities (MSFs) 110, 120, 130 and the storage facility manager (SFM) 140. These devices are also connected to an interconnection mechanism such as switch 150 through data lines 160, 170, 180 and 190. SFM 140 may also be connected to a separate storage unit such as disk drive 200, through data lines 210. The number of MSFs and peripheral devices present in the system is determined by the needs of the system and the system designer.

The MSFs in MSS 100 are designed as special purpose memory devices composed of a fault-tolerant micro processor attached to a large bulk of high-speed memory. The processor in the MSF runs a program supporting only those functions necessary to provide the storage and receiver of messages. This simplicity maximizes the reliability of the MSF. However, as understood by those skilled in the art, alternate designs are also feasible. The MSF could, for example, be implemented using any general-purpose computer with sufficient memory.

The SFM in MSS 100 is designed as any general purpose computer with sufficient processing speed to handle the requests to it in a timely fashion. Using its disk drives and its connection to the MSF S the SFM manages all of the complexities related to the selection of which hosts will use which MSF S, and the orderly transfer of messages from one MSF to another, or to disk. This separation of responsibilities allows the MSF to provide fast and reliable message storage and retrieval services.

A system such as MSS 100 would operate in a manner to enhance communication reliability and to insulate the end user from a failure of any of the host processors. When a request, such as a data base access, occurs in the system through communication lines 116, the request is stored in a previously designated MSF. The MSF would return a name to the communication processor which sent the message, with said processor passing that name to some data base host, which would retrieve the message when it is ready to do so and without disturbing the communication processors from any of their tasks.

In this way, the data base processors will only be receiving unsolicited signals in short bursts (i.e. the name of the stored message). As will be described more fully, this also allows for unique names being assigned to each incoming message without the need to poll the system for unused names and also to speed retrieval of the messages when they are needed.

When a message enters the system, it is transferred to the MSF designated for the given host processor and stored in the first free location in the designated MSF. The name that is both used by the MSF and returned to the host is comprised of both a location and a generation number.

A generation number is unique to each MSF in an MSS. The unique generation numbers are assigned and monitored by the SFM. Thus, in a system such as MSS 100, initial generation numbers could be 1 for MSF 110, 2 for MSF 120 and 3 for MSF 130. A location corresponds to the address in the MSF where the message is stored. Location addresses would be identified in all MSFs in a system. As any MSF approached full capacity, SFM 140 would assign a new generation number and move the messages named under the previous generation number to either free space in any of the other MSFs or into storage in a device such as disk drive 200.

The name that is sent to one of the data base processors 113-115 after a message is submitted for storage is comprised of the generation number of the given MSF at the time the message is received, as well as the location within the MSF where the message is stored. If a message had been moved because an MSF had become full, the new location of the message would be available to an MSF through coordination by the SFM. In this way, when there is a request to retrieve a message that is moved, the message would not be found in the MSF, but could be retrieved by signaling the SFM for the present location of the message.

It can thus be seen that the MSFs are not designed to determine whether or not a given name is available for assignment to a message since the location of the message and a generation number unique to a particular MSF comprises the name of the message. Naming is inherently accomplished by the system since there can only be one generation number/location mapping.

Figure 2:
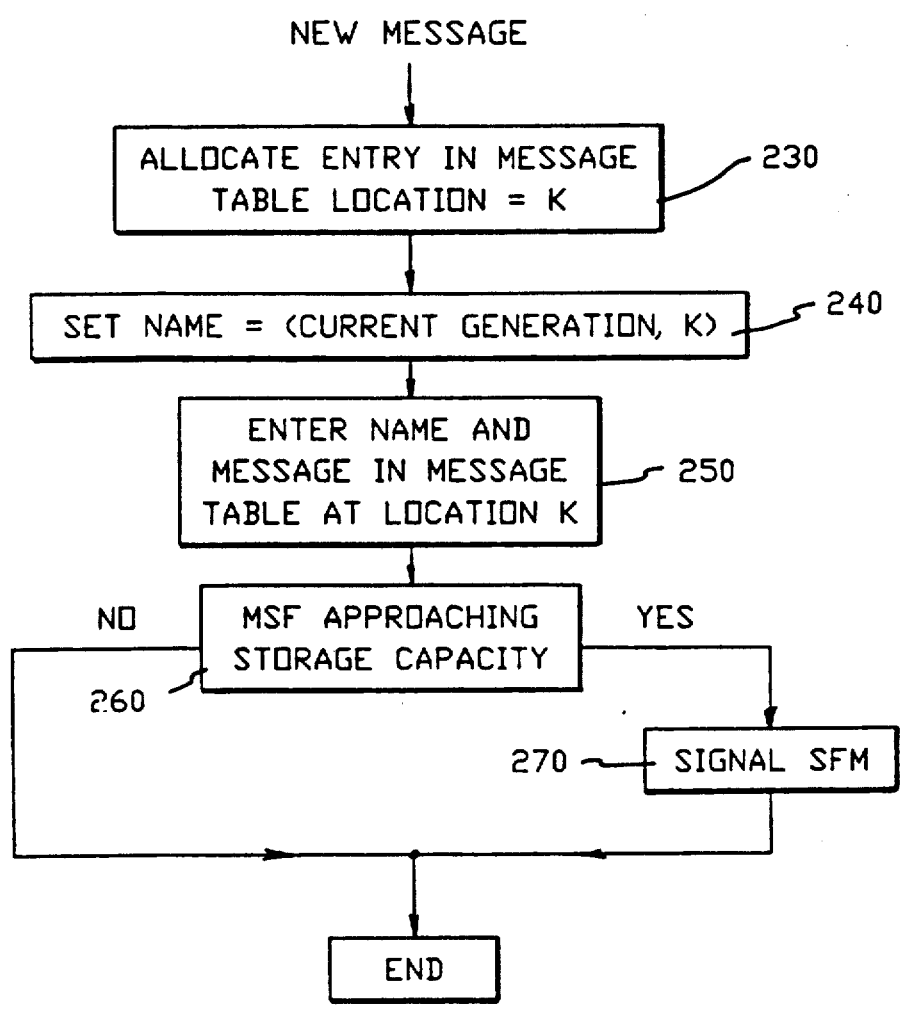
FIG. 2 is a flowchart illustrating how a new message is named and stored in the system of FIG. 1.

Referring now to FIG. 2, there is shown a flow diagram for the method of storing a new message. It is assumed that the current generation number for this particular MSF has already been obtained from the SFM.

When a new message arrives, an unoccupied location in the particular MSF is chosen as the storage location for the message. As shown in block 230 an entry is also made in the message table to document the position of the message. Next, a name is assigned for the new message, comprises of the current generation number and the storage location. The name of the message and the message itself are then stored in the MSF at the designated location and the name of the message is returned to the creator of the message. The name of the message is stored in the MSF so that if a retrieval request occurs, the name stored in the MSF can be compared to the requested name to determine if the message in a given location is the message being requested. The MSF then determines if it is nearing its storage capacity, as shown in block 260, and, if so, sends a message to the SFM indicating that the MSF is reaching its capacity for message storage. If not, the routine ends.

Figure 3:
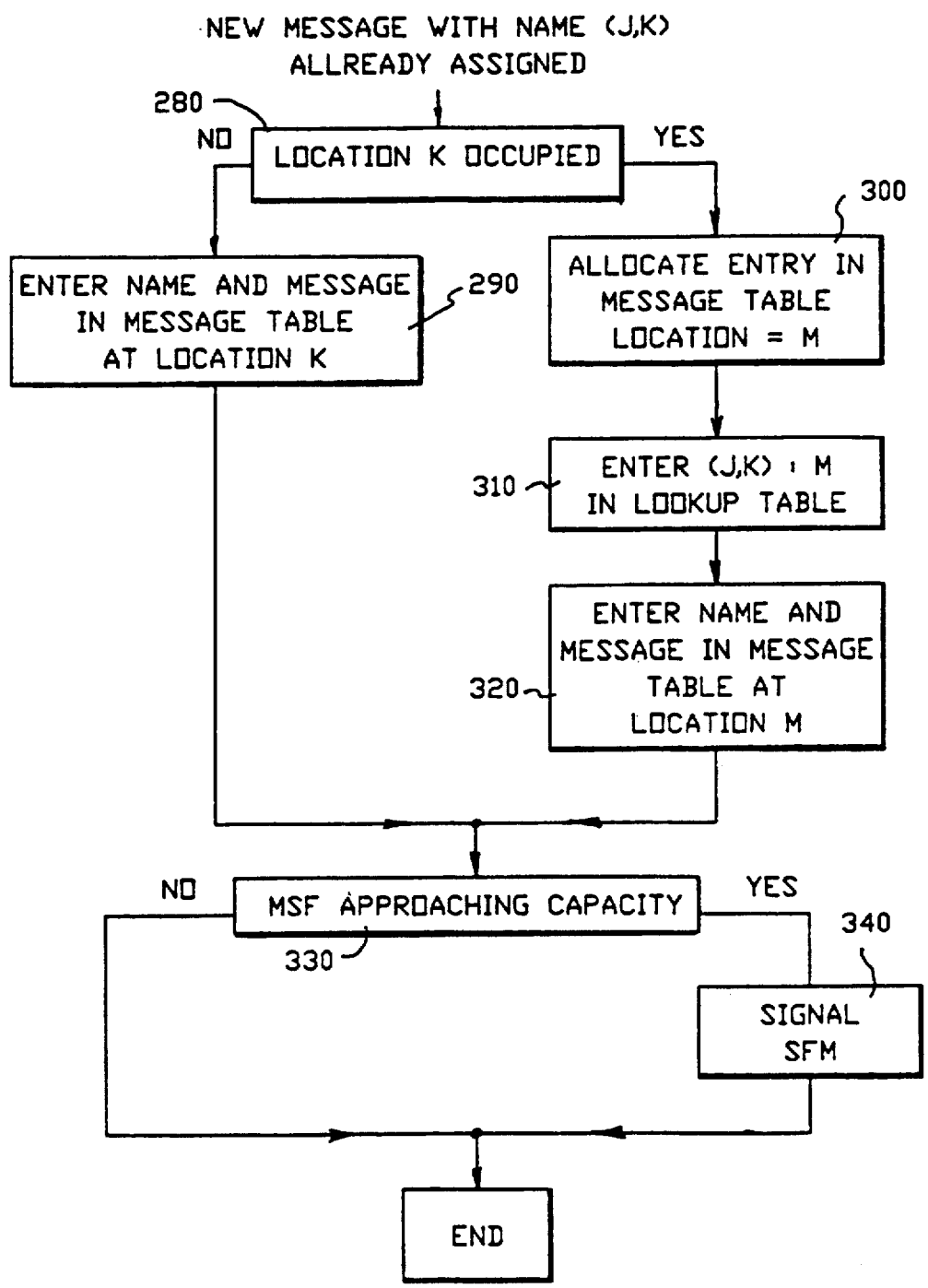
FIG. 3 is a flowchart illustrating the steps for storing a message that has been previously named.

Referring now to FIG. 3, there is shown a flow diagram of the method for allocating storage for a message which already has been named. This situation occurs when messages are being transferred from one MSF to another. An example would be when an MSF is approaching or has reached its capacity and its messages must be off-loaded to make room for more incoming messages. In such a situation, it is possible that the messages would be off-loaded to another MSF (or possibly a storage device such as a disk drive 200).

As shown in block 280, when a message with a name already assigned arrives at an MSF, the first step is to check if the location specified in the message's name is occupied. If not, the message is stored in the location designated in its name along with the name of the message. The name of the message would also be stored in a look-up table so that a later request to retrieve the message could be honored. If the location designated in the message's name is already occupied, then an unoccupied location is picked for the message as shown in block 300. While the message maintains its original name, a new description or designation for the message is inserted in the look-up table of the MSF. This designation consists of the message's original name plus the new location where the message is stored in the new MSF. Control then moves to block 320 where the name and the message are stored at this new and unoccupied location.

When this process is complete, the MSF again determines whether or not it is approaching full capacity, as shown in block 330 and if so, a message is sent to the SFM indicating that the MSF is full or approaching full, as shown in block 340. If the MSF is neither approaching nor has reached its capacity then the routine ends.

Figure 4:
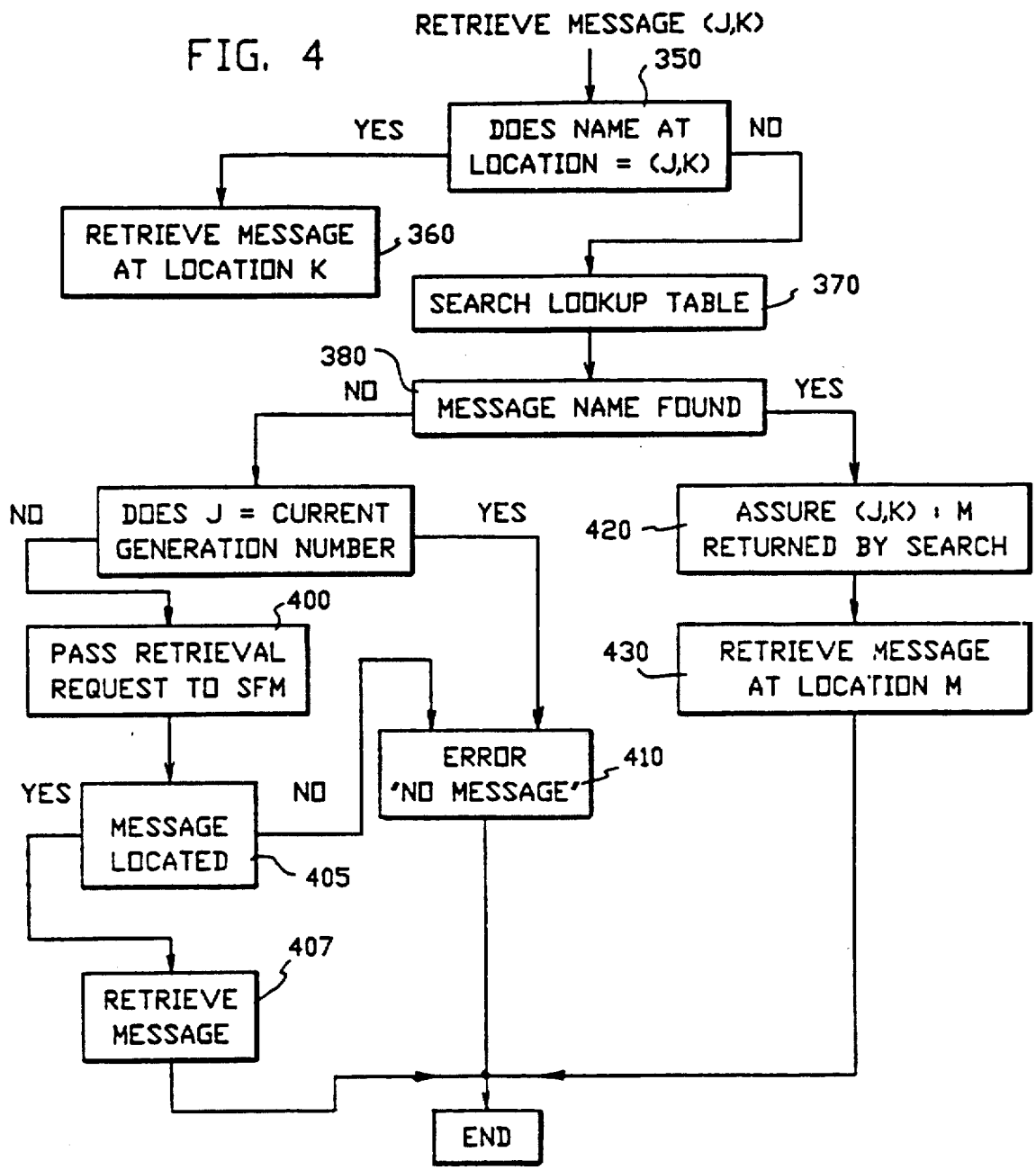
FIG. 4 is a flowchart illustrating how a message is retrieved.

Referring now to FIG. 4, there is shown a flow diagram for the method of retrieving messages from a message storage system. This operation begins with a request for the retrieval of the given message by a device such as a hose processor, 111-115.

Control of the message retrieval operation begins at block 350 where the retrieval request is entered. The first step then, as shown in block 350, is to determine whether the name of the message is stored at the location specified by the message name. If the message name is the same as the name at the location specified, then the message is retrieved as shown in block 360 and sent back to the requestor of the message.

If the name at the location specified in the requested message does not equal the name of the message being requested, then the look-up table of the MSF is searched as illustrated in block 370. Note that the location of the name (and the message) is obtained from the part message name that contains location information, but that when the message being requested and the message name at the location specified in the message being requested are compared, it is the full name that is compared. The full name is comprised of both the generation number and the original location.

Control moves from block 370 to block 380 where a decision is made as to whether or not the name was present in the look-up table. If the name was present in the look-up table, then the storage location specified in the look-up table is examined and if the message is present at that location, it is returned to the requester of the message. This would be the situation for a message which had been moved from another MSF to the present MSF. In this case, the look-up table would contain the name of the message as well as the new location in the MSF that contained the message.

If the search of the look-up table is unsuccessful, control would pass to decision block 390 where a determination is made if the current generation number is equal to the generation number of the message being requested. If it is equal, then an error has occurred, since identical generation numbers means that the message should be located at the location specified in the message's name. Since it was not found at the specified location, nor in the look-up table, an error has occurred and an error message is sent back to the message requester, as shown in block 410.

If the message generation number does not equal the current generation number, then the request is passed along to the SFM for retrieval of the message, as shown in block 400. The SFM at this time would search its table of message locations to determine if it had relocated the message into another MSF because of an approaching full or full condition, as shown in decision block 405. The SFM would then transfer the message request to the MSF where it had previously relocated the message and the above retrieval operation would be repeated at the MSF where the message had been relocated, as shown in block 407. If the message is not located, an error has occurred and an error message is sent back to the message requester, as shown in block 410.

Figure 5:
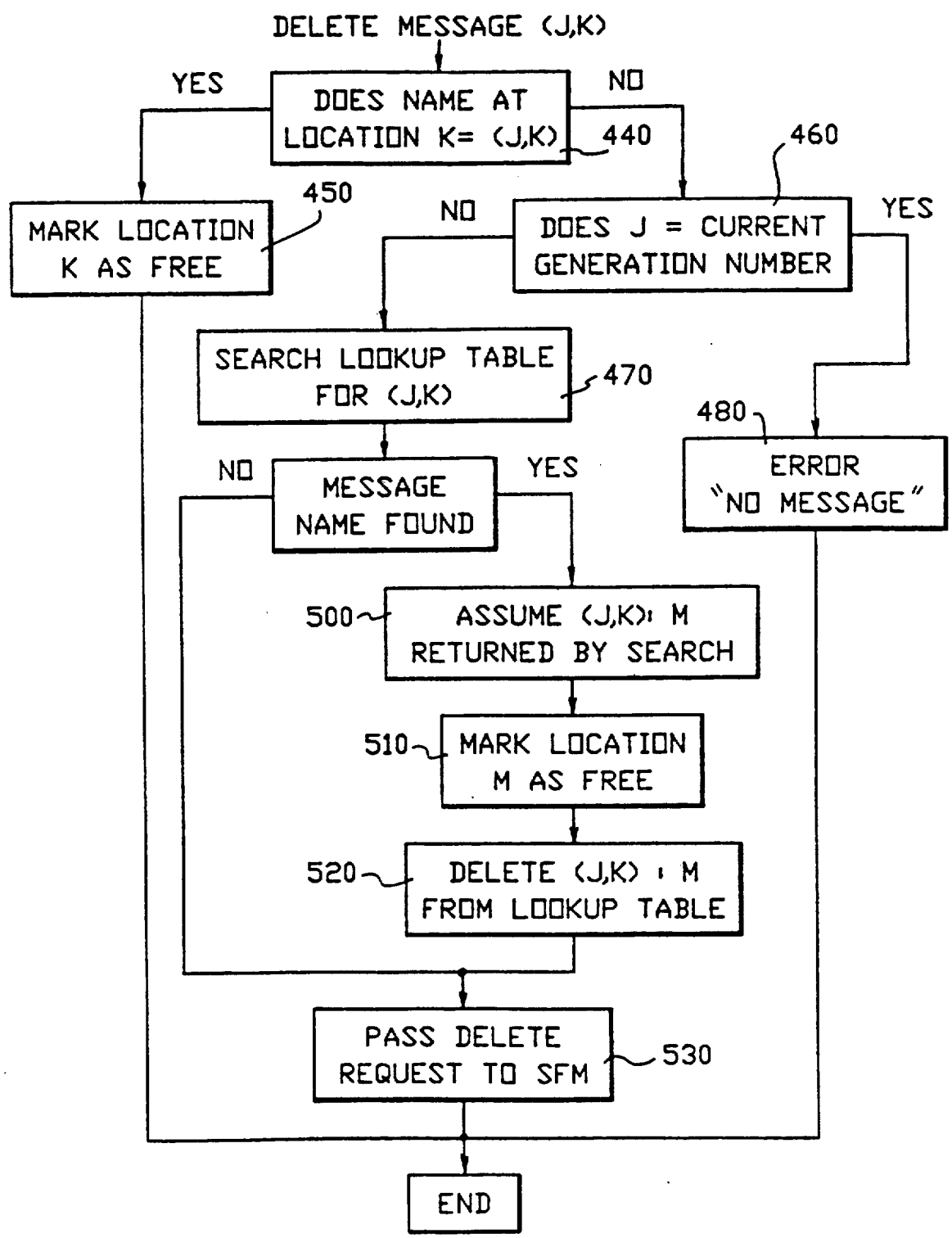
FIG. 5 is a flowchart illustrating how a message is deleted.

Referring now to FIG. 5, there is shown a flow diagram of the method for deleting a message from the message storage system. Operation begins with a request to delete a message being sent to block 440.

At decision block 440, a determination is made whether the name of the message to be deleted is stored at the location specified in the message's name. If the specified location contains the message's name, then that location is marked as a free location for future messages, as shown in block 450. If the location does not contain the name of the message to be deleted, then control proceeds to block 460 where the current generation number is compared to the generation number in the name of the message to be deleted. If the generation numbers are identical, then an error message is signaled in block 480 that no such message exists. If the generation numbers are not identical, control proceed to block 470 where a search of the look-up table in the present MSF is undertaken.

In decision block 490, it is determined whether the look-up table search has been successful. If the search is successful and the name of the message to be deleted is located in the look-up table, then the location specified in the look-up table entry is examined, as shown in block 500. The location is then marked, as shown in block 510, as a free location where future messages may be stored. Control then proceeds to block 520 where the name and location of the message are deleted from the look-up table.

If the determination in block 490 is negative, meaning that the name is not present in the look-up table, then a search request is passed along to the SFM, as indicated in block 530. The SFM would then search its table to see if the message had been relocated to another MSF. If so, the process as described in FIG. 5 would be repeated at the particular MSF where the message had been relocated.

Figure 6:
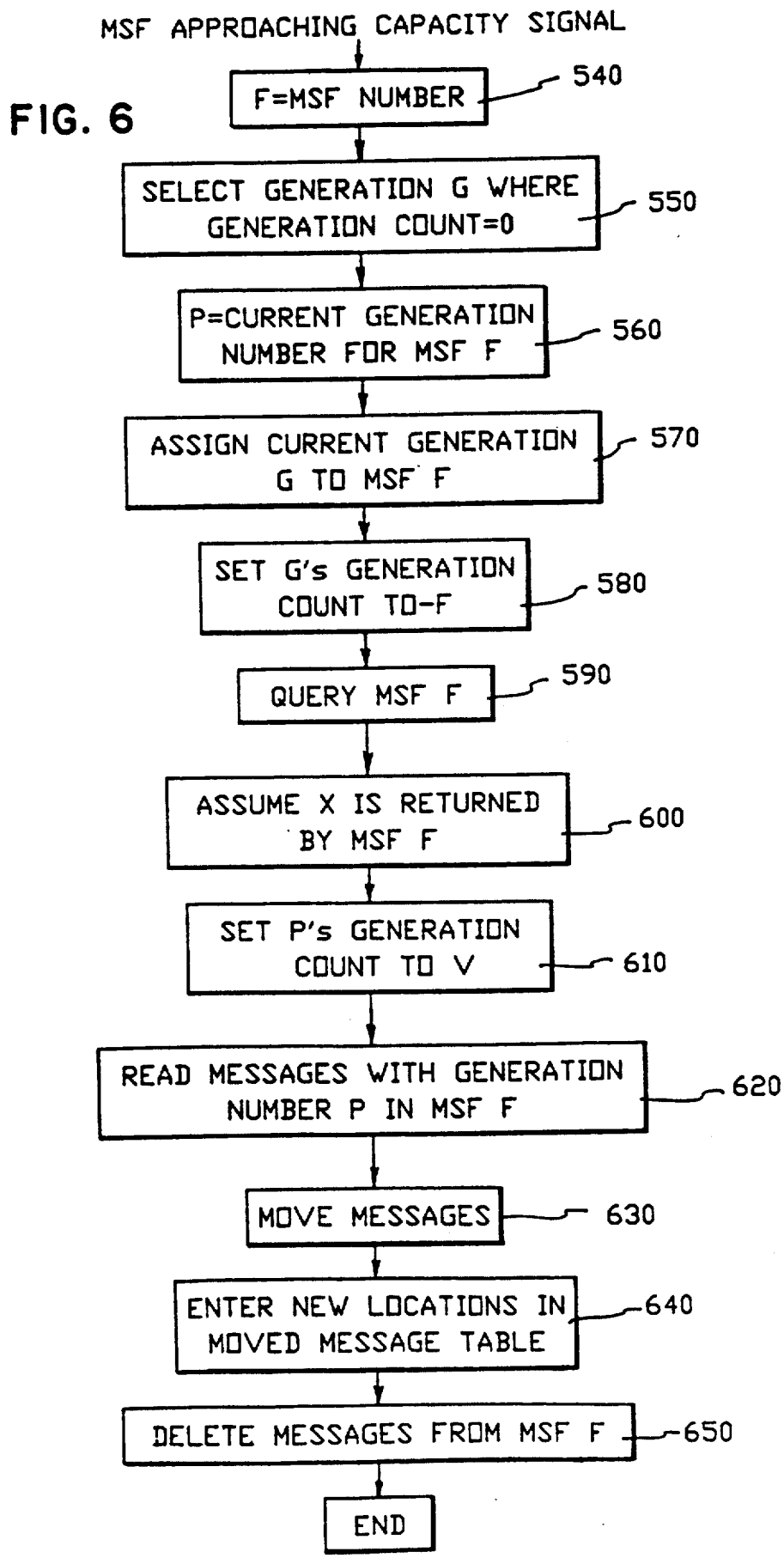
FIG. 6 is a flowchart illustrating distribution of messages by the SFM when an MSF is full.

Referring now to FIG. 6, there is shown a flow diagram for an example situation of an SFM receiving a message from an MSF when said MSF is either approaching full or full. This signal would reach the SFM and logic flow would then begin in block 540.

In block 540, it is assumed that the MSF sending the message has a designation number represented by F, for this example. The SFM would then select a generation number represented by G such that the generation count for generation number G is 0, as shown in block 550. A generation count of 0 is a representation within the SFM that a generation number has not been assigned. A generation count that is negative means that that generation number is assigned to an MSF designated by the absolute value of the generation count. A positive generation number means that a generation number has been used, but is not currently being used in the assignment of new names. This situation arises for a generation number used in the assignment of names where those names and messages are presently stored in other MSFs or in a storage device such as disk drive 200.

In block 560 it is assumed that MSF S has a current generation number represented by the letter P. In block 570 the current generation number represented by G is assigned to MSF F. Concurrently, as shown in block 580, G's generation count is set to negative F. This indicates that the generation number G is assigned to the MSF having the absolute value of negative F. In this case, this would equal MSF F.

While the SFM maintains a record of which generation numbers are assigned, it is each individual MSF which maintains a record of how many messages are stored within the individual MSF. Thus, as shown in block 590, MSF F must be queried as to the number of messages it contains with the generation number.

For illustrative purposes, block 600 shows the MSF queried returning a number X, which equals the number of messages containing the generation number P.

The next step is to set P's generation count to the number X. The number X returned will be a positive value. By assigning the number X to P's generation count the SFM would know that P is a generation count that is being used and further, since it is a positive value, the SFM would know that there are messages distributed among the MSS with a generation number P in their names. This is illustrated in block 610.

Block 620 shows the next step whereby the SFM reads the messages with a generation number of P from MSF F. Those messages are then written to other MSFs (or possibly a storage device, such as disk drive 200) while maintaining the original name of the messages, as shown in block 630. The location of these moved messages is stored in a moved message table, as shown in block 640. The final step, illustrated in block 650, is the deletion of all messages with the generation number P from MSF F. The routine at this point would end.

Referring now to FIG. 7, there is shown a block diagram for the SFM's operation when it receives a message retrieval request from a given MSF.

For purposes of illustration, it is shown in block 660 that F is assumed to be the number of the given MSF and (J,K) is the name of the given message. In decision block 670, a determination is made as to whether generation J is assigned to any of the MSFs. If the determination is true, then control moves to block 680, where for purposes of illustration, it is assumed that MSF C contains the generation number of the message requested to be retrieved. Thus, the message retrieval request would be forwarded to MSF C, as shown in block 690. Should the determination from block 670 be false, then control passes to decision block 700 where it is determined whether (J,K) is specified in the moved message table. Should this determination be false, then an indication that the message does not exist is returned to the MSF requesting the message, as shown in block 710.

For purposes of illustration, let N be the current location of message (J,K) as shown in block 720. This would be the case if the determination of decision block 700 is true. Then the message retrieval request would be forwarded to MSF N as shown in block 730 and the routine would end.

Referring now to FIG. 8, there is shown a flow diagram illustrating the method by which the SFM transfers messages from one MSF to another. For purposes of illustration, the letter F designates the number of the prior MSF, i.e., the MSF having its messages transferred out. The letter T represents the number of the new MSF to which the messages from MSF F are being transferred. This is illustrated in block 740. The letter P represents the current generation number assigned to MSF F, as shown in block 750.

The SFM must pick a generation number N such that the generation count is 0, as shown in block 760. This merely represents that a generation number is not in use. The SFM then assigns the generation number N to MSF T, as shown in block 770.

Next, the SFM must signal all host processors that are using MSF F to use MSF T for all message storage operations. This is shown in block 780. The SFM must then wait for MSF F to stop receiving and processing requests from the hosts as shown in block 790. During this interim waiting period, the algorithm illustrated by FIG. 7 is used by the SFM to handle requests from the host processors sent to MSF T for messages that are still located in MSF F. This is the period prior to complete transfer of messages from MSF F to MSF T.

The SFM would then read all the messages in MSF F and copy them to another location, such as another MSF or a storage device, such as disk drive 200. This is illustrated in block 800. Following the transfer of all messages out of MSF F, MSF F should be empty of all messages and can thus be taken out of service for repair, replacement or modification, as shown in block 810.

Referring now to FIG. 9A, there is shown a block diagram for the selection of a generation number when there are no generation numbers free. This situation may arise when there are a limited number of generation numbers for an MSS. After an MSF has signaled the SFM that its capacity has been met and it needs to off-load messages, the SFM would normally select a free generation number and assign it to the MSF prior to off-loading the messages. It is possible, however, that all generation numbers are in use.

In this situation, it is necessary for the SFM to pick a new generation number from the possible generation numbers even though they are all in use. The SFM must then find all existing messages whose name includes the generation number (again, assuming a limited number of generation numbers possible). The original storage locations for these existing messages must be extracted from their names and the messages moved to those original locations. Should there be other messages already stored at those locations (under a different generation number), those additional messages are unloaded from the MSF and stored elsewhere, such as in a storage device like disk drive 200. The existing messages would then be stored at the location specified in their name, and the SFM would signal the MSF to begin using the new generation number it selected.

Block 820 shows the assumptions made for purposes of this example. In this case, T represents the MSF which has reached capacity. M represents the smallest message count found so far. It is initialized to a value greater than any possible message count. G represents the generation number with the smallest message count and is initialized to zero. M represents a value for comparative purposes and G is initialized at zero.

Block 830 begins the routine for selecting which generation number (represented by the letter J) will be selected as the next generation number used by the SFM. In block 840, the letter C represents the generation count for a given generation number J. As shown in decision block 850, if the value of C is less than zero, control would pass along to block 860. The MSF with generation count of −C (which would be a positive value) is queried to obtain the number of messages that are stored there with that generation number. C would then be reinitialized to the number of messages returned by MSF −C, as shown in block 870. In block 880, it is determined whether or not C is less than the value specified for M. If it is, then M is reinitialized to the value of C and G is assigned to the generation number J. Control then moves back to block 830 until this routine is completed for each and every generation number J, for systems containing a limited number of generation numbers J.

When the above steps are completed for each generation number J, control moves to block 900 where C is assigned to equal the generation count for generation G. Decision block 910 determines whether C is less than zero. Should C be less than zero, then control moves to block 920 where the list of messages with the names (G, K) [where K represents any location under the generation G] from the moved messages table of the SFM. If C was determined to be less than zero in block 910, then control would move to block 930 where the SFM would obtain the list of messages with the name (G, K) from MSF −C (which would represent a positive value).

Figure 9B:
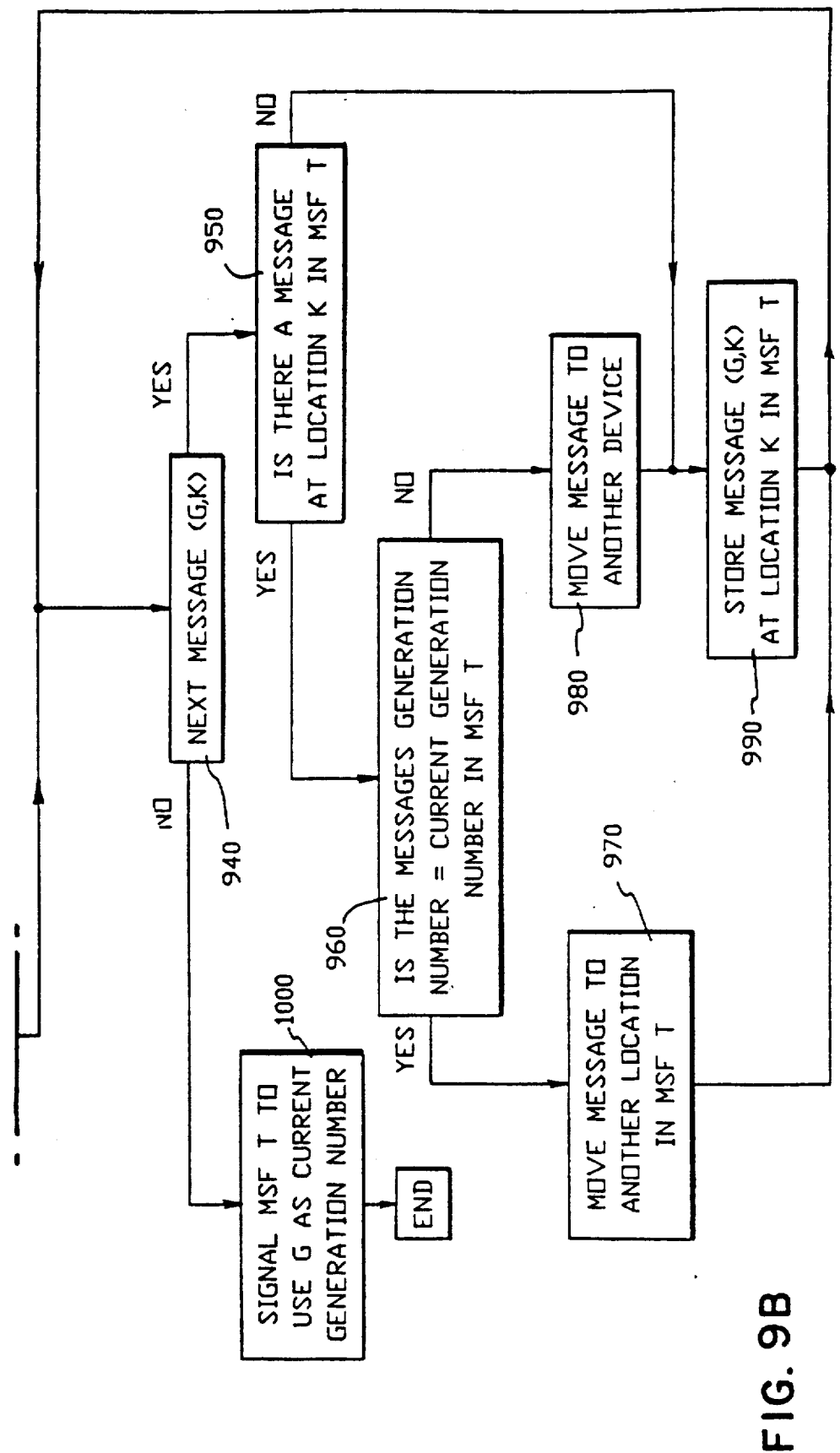

Referring now to FIG. 9B, there is shown the next part of this routine where messages for the generation number determined in the steps above are moved. This is represented in block 940 through a page connector A. Control continues with block 950 where it is determined whether or not a message is stored at a location K in MSF T (the MSF in question). If there is, it is decided in block 960 whether the generation number in the message stored at location K is the current generation for MSF T. If the message generation number is the current generation number of MSF T, then the message will be stored at another location in MSF T, as shown in block 970. Should the generation numbers be different, then the message will be moved to another location, not necessarily an MSF, as shown in block 980. Then, the message specified by (G, K) will be stored at the location of the message recently moved out of MSF T. Control would then return back for the next message specified by (G, K). When this is complete, MSF T is signaled by the MSF to use generation G as its current generation number.

EXAMPLE OPERATION

An example operation of a message storage system, such as MSS 100, begins with the assignment of generation numbers to the MSFs in the system. In this case, the SFM would assign generation number 1 to MSF 110, generation number 2 to MSF 120, and generation number 3 to MSF 130. The first message that comes into the system from a host processor being assigned to MSF 1 would be stored at location 1. Using the message "Hi there," as an example, the following would be the status of the message:

| Current Generation | Message Name | Table Message | Look-up Table |
|---|---|---|---|
| 1 | (1,1) | Hi there | 25 |

Now more messages can be added to the system. If other host processors are assigned to MSF 2 and MSF 3, respectively, messages coming in from these processors would be stored in the respective MSFs. Continuing with the example (all messages stored in SMF 110), the next two messages to be stored already have names assigned to them. These messages are "That's life," with a name (3,2) and a third message, "Here today" with a name (2,1) Thus, the updated status table would appear as follows:

| Current Generation | Message Name | Table Message | Look-up Table |
|---|---|---|---|
| 1 | (1,1) | Hi there | (2,1):3 |
|   | (3,2) | That's life |   |
|   | (2,1) | Here today |   |

The request to retrieve messages would initially be dealt with by the MSF. For example, if three messages named (1,1), (2,1), (1,2) were requested from a host processor after the messages described above were stored, processing would begin with the MSF where the messages were stored. In this case, the message (1,1) would be found at location 1. The message (2,1) would not be found at location 1, but after searching the look-up table would be found at location 3. The message (1,2) would not be found at location 2 and would not be found after searching the look-up table. Since the only messages in the system are the three described above, a signal to the SFM would not result in locating the messages and an error signal would be returned to the message requester.

Returning to the three original messages, the system also provides for the deletion of messages. If signals were entered to delete messages named (1,1) and (2,1) the status of the system would appear as follows:

| Current Generation | Message Name | Table Message | Look-up Table |
|---|---|---|---|
| 1 | (3,2) | That's life |   |

The SFM contains information regarding the generation, generation count, moved messages and current location. This information is stored within various tables within the SFM. A table containing MSF generation number and generation count information would begin with generation counts being zero for all possible generation numbers. After the SFM is initialized, the MSFs receiving generation numbers, such as MSF 110 being initialized with a generation number 1, MSF 120 being initialized with a generation number of 2, and MSF being initialized with a generation number of 3, the SFM assigns a generation count equal to the negative of the generation number. Thus, MSF 110 would have a generation count of $-1$, MSF 120 would have a generation count of $-2$, and MSF 130 would have a generation count of $-3$. All this information would be stored in a table within SFM 140. Also, the moved messages table which contains the name of the moved message and its current location would initially start out with no information and would remain in this state until messages were actually moved from one MSF to another or another storage device such as disk drive 200. At this time, the moved message table would be updated with the information regarding the location of the messages moved. When messages are moved and generation counts for various MSFs are changed, the generation number/generation count table would be updated with the current information as well as reflecting that a generation number is in use, but is not in current use. For the generation numbers that are in use, but not current use, the generation number/generation count table would reflect this information by having a positive value in the generation count field corresponding to such a generation number. The current generation number table, however, would represent that the new generation number is now assigned to the given MSF. The following tables will show the status of the system before changing the current generation of MSF 1 and then after changing the current generation of MSF 1.

Before changing the current generation for MSF 1:

| MSF | | Current Generation | | | |
|---|---|---|---|---|---|
| 1 | | 1 | | | |
| 2 | | 2 | | | |
| Generation: | 1 | 2 | 3 | 4 | 5 |
| Generation Count: | −1 | −2 | 1 | 3 | 2 |
| Moved Messages | | Current Location | | | |
| 1 | | disk 7 | | | |

| MSF 1: Current Generation | Message Name | Table Message | Look-up Table |
|---|---|---|---|
| 1 | (1,1) | Hi there |   |
|   | (1,2) | Here today |   |

After changing the current generation for MSF 1:

Current

-continued

| MSF | Generation |
|---|---|
| 1 | 3 |
| 2 | 2 |

| Generation: | 1 | 2 | 3 | 4 | 5 |
|---|---|---|---|---|---|
| Generation Count: | 2 | −2 | −1 | 3 | 2 |

| Moved Messages | | Current Location | |
|---|---|---|---|
| MSF 1: | | | |
| Current Generation | Message Name | Table Message | Look-up Table |
| 1 | (1,1) | Hi there | (3,2):3 |
| | (1,2) | Here today | |
| | (3,2) | That's life | |

What is claimed:

1. In a message storage system implemented on a computer, having a plurality of message storage facilities with storage locations and associated storage location designations, a method of storing messages from a plurality of host devices comprising the steps of:
   (a) assigning an individual generation number to each message storage facility;
   (b) locating a free storage location in one of the message storage facilities upon receipt of a message from a host device by said one message storage facility;
   (c) storing the message in the free storage location;
   (d) identifying the stored message by an individual name, said name comprised of the generation number of the message storage facility where it is stored and the associated storage location designation;
   (e) returning the individual name to the host device which sent the message;
   (f) repeating steps (b)-(e) until said message storage facility approaches its storage capacity of messages;
   (g) changing the generation number of said one message storage facility after said one message storage facility approaches its storage capacity of messages; and
   (h) moving the messages stored in said one message storage facility after said one message storage facility approaches its storage capacity of messages it reaches its storage capacity.

2. The method of claim 1 in which there is provided the further step of moving all of the read messages to at least other message storage facility.

3. The method of claim 2 in which there is provided the further steps of:
   (a) comparing the location designated in the name of a message to be moved to the corresponding location in the message storage means to which it has been moved,
   (b) if that location is unoccupied, storing the message at that location, and
   (c) if that location is occupied, storing the message at a free location, and indexing the message by its name and its new location.

4. The method of claim 1 in which there is provided the further steps of:
   (a) comparing the name of a message to be retrieved to the name of the message previously stored at the location specified in the name of the message to be retrieved; and
   (b) retrieving the message previously stored if the name of said message matches the name of the message to be retrieved.

5. The method of claim 4 in which there is provided the further steps of:
   (a) searching the look-up table of a message storage facility to determine if the message has been moved to a different location within the message storage facility if the comparison did not match,
   (b) retrieving the message previously stored if the name of the message is found in the look-up table,
   (c) signaling the storage facility manager to locate the message if the message has not been found, and
   (d) retrieving the message previously stored if the message was located by the storage facility manager.

6. A message storage system implemented with a computer system having a plurality of message storage facilities with storage locations and associated storage location designations for storing messages from a plurality of host devices comprising:
   (a) means for assigning an individual generation number to each message storage facility;
   (b) means for locating a free storage location in one of the message storage facilities upon receipt of a message from a host device by said message storage facility;
   (c) means for storing the message in the free storage location;
   (d) naming means for identifying the stored message by an individual name, said name comprised of the generation number of the message storage facility where it is stored and the associated storage location designation, means for returning the individual name to the host device which sent the messages; and
   (e) means for returning the individual name to the host device which sent the message;
   (f) means for repeating steps (b)-(e) until said message storage facility approaches its storage capacity of messages;
   (g) means for changing the generation number of said one message storage facility after said one message storage facility approaches its storage capacity of messages; and
   (h) moving the messages stored in said one message storage facility after said one message storage facility approaches its storage capacity of messages it reaches its storage capacity.

7. The system of claim 6 in which there are provided means for moving all of the stored messages in said message storage facility to at least one other message storage facility.

8. The system of claim 7 in which there is provided
   (a) means for comparing the location designated in the name of a message to be moved to the corresponding location in the message storage means to which it has been moved,
   (b) means for storing the message at that location if that location is unoccupied, and
   (c) means for storing the message at a free location if that location is occupied, and indexing the message by its name and its new location.

9. The method of claim 1 in which there is provided the further step of moving all of the stored messages in said one message storage facility to an external storage device.

10. The system of claim 6 in which there are provided:
    means for moving all of the stored messages in said one message storage facility to an external storage device.

* * * * *